(12) United States Patent
Yang

(10) Patent No.: US 11,882,918 B2
(45) Date of Patent: Jan. 30, 2024

(54) MAKE-UP ASSISTANCE METHOD AND APPARATUS AND SMART MIRROR

(71) Applicant: BOE Technology Group Co., Ltd., Beijing (CN)

(72) Inventor: Yonggui Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 16 days.

(21) Appl. No.: 17/702,403

(22) Filed: Mar. 23, 2022

(65) Prior Publication Data
US 2022/0211163 A1    Jul. 7, 2022

Related U.S. Application Data

(63) Continuation-in-part of application No. 16/631,279, filed as application No. PCT/CN2019/086211 on May 9, 2019, now abandoned.

(30) Foreign Application Priority Data

May 28, 2018   (CN) .......................... 201810523725.7

(51) Int. Cl.
*A45D 44/00*    (2006.01)
*G06V 40/16*    (2022.01)
(Continued)

(52) U.S. Cl.
CPC ........... *A45D 44/005* (2013.01); *G06F 3/167* (2013.01); *G06T 3/4076* (2013.01); *G06V 10/56* (2022.01);
(Continued)

(58) Field of Classification Search
CPC ......... G06T 11/60; G06T 7/90; G06T 3/4053; G06T 7/40; G06T 2200/16; G06T 2207/30201
See application file for complete search history.

(56) References Cited

U.S. PATENT DOCUMENTS

| 10,251,463 B2 * | 4/2019 | Yamanashi | .......... A45D 44/005 |
| 2008/0080766 A1 * | 4/2008 | Payonk | ..................... G06T 7/90 |
| | | | 382/167 |

(Continued)

FOREIGN PATENT DOCUMENTS

| CN | 105005897 A | 10/2015 |
| CN | 105447125 A | * 3/2016 |

(Continued)

OTHER PUBLICATIONS

Jiang et al.("Facial aging simulation based on super-resolution in tensor space.", IEEE, 2008) (Year: 2008).*

(Continued)

*Primary Examiner* — Xin Sheng
(74) *Attorney, Agent, or Firm* — Westman, Champlin & Koehler, P.A.

(57) ABSTRACT

A make-up assistance method includes: acquiring a facial image of a user; acquiring a makeup effect image selected by the user; extracting a make-up region from the facial image of the user, and transmitting the makeup effect image and information about the make-up region to a makeup matching server; performing, by the makeup matching server, a skin detection on the make-up region, so as to obtain skin information of the facial image; determining, by the makeup matching server, at least one makeup plan matched with the make-up region according to the skin information and the makeup effect image; presenting the at least one makeup plan; determining a difference between the makeup effect image and the facial image using a preset algorithm; and generating makeup modification prompt information for a region in the makeup effect image or the facial image where the difference is greater than a threshold.

14 Claims, 7 Drawing Sheets

(51) Int. Cl.
*G06T 3/40* (2006.01)
*G06F 3/16* (2006.01)
*G06V 10/56* (2022.01)

(52) U.S. Cl.
CPC .......... *G06V 40/162* (2022.01); *G06V 40/171* (2022.01); *A45D 2044/007* (2013.01)

(56) References Cited

U.S. PATENT DOCUMENTS

| | | | | |
|---|---|---|---|---|
| 2015/0366328 | A1* | 12/2015 | Tamura | G06T 11/00 434/100 |
| 2019/0080162 | A1* | 3/2019 | Shen | G06T 7/0014 |
| 2020/0211245 | A1 | 7/2020 | Yang | |

FOREIGN PATENT DOCUMENTS

| | | |
|---|---|---|
| CN | 105447125 A | 3/2016 |
| CN | 105455522 A | 4/2016 |
| CN | 106294820 A | 1/2017 |
| CN | 108053365 A | 5/2018 |
| CN | 108062400 A | 5/2018 |
| CN | 108765268 A | 11/2018 |
| SG | 10201508281W A * | 6/2015 |

OTHER PUBLICATIONS

Iwabuchi et a! ("Smart makeup mirror: Computer augmented mirror to aid makeup application." International Conference on Human Computer Interaction. Springer, Berlin, Heidelberg, 2009). (Year: 2009).*

U.S. Patent Office issued prosecution for U.S. Appl. No. 16/631,279, filed Jan. 15, 2020, including: Non-Final Rejection dated Sep. 2, 2021, 23 pages; Final Rejection dated Dec. 24, 2021, 28 pages; Advisory Action dated Mar. 7, 2022, 5 pages; 56 pages total.

* cited by examiner

MAKE-UP ASSISTANCE METHOD AND APPARATUS AND SMART MIRROR

CROSS-REFERENCE TO RELATED APPLICATION(S)

This application is a continuation-in-part of U.S. patent application Ser. No. 16/631,279 filed on Jan. 15, 2020, which was a 371 International Application of PCT Application No. PCT/CN2019/086211, filed on May 9, 2019, which claims priority to the Chinese Patent Application No. 201810523725.7, filed on May 28, 2018, all of which are incorporated herein by reference in their entireties.

TECHNICAL FIELD

The present disclosure relates to the field of smart device technology, and more particularly, to a make-up assistance method and apparatus, and a smart mirror.

BACKGROUND

Convolutional smart mirror products mainly provide functions of, for example, displaying news and road conditions etc. However, the convolutional smart mirror products may not realize make-up assistance.

SUMMARY

The present disclosure proposes a make-up assistance method and apparatus, and a smart mirror.

According to an aspect of the present disclosure, there is provided a make-up assistance method, comprising:
  acquiring a facial image of a user;
  acquiring a make-up plan selected by the user, the make-up plan comprising a makeup effect image;
  determining a difference between the makeup effect image and the facial image using a preset algorithm; and
  generating makeup modification prompt information for a region in the makeup effect image or the facial image where the difference is greater than a threshold.

In an example, before acquiring a make-up plan selected by a user, the make-up assistance method further comprises:
  extracting a make-up region from the facial image of the user;
  transmitting information about the make-up region to a makeup matching server; and
  presenting at least one make-up plan determined by the makeup matching server according to the information about the make-up region for selection.

In an example, after extracting the make-up region from the facial image of the user, the make-up assistance method further comprises:
  improving a definition in the make-up region of the facial image using a face super-resolution algorithm.

In an example, extracting a make-up region from the facial image of the user comprises: identifying the make-up region in the facial image using a feature identification algorithm.

In an example, determining a difference between the makeup effect image and the facial image using a preset algorithm comprises:
  calculating at least one of a feature difference value, a texture difference value, or a color difference value between the make-up region in the facial image and a respective make-up region of the makeup effect image.

In an example, the make-up assistance method further comprises:
  generating a modified makeup effect image according to a modification operation performed by the user on the makeup effect image; and
  uploading the modified makeup effect image to the makeup matching server.

In an example, generating makeup modification prompt information comprises:
  highlighting a region in the makeup effect image or the facial image where the difference is greater than the threshold.

In an example, the make-up plan further comprises makeup steps for the makeup effect image.

According to another aspect of the present disclosure, there is provided a make-up assistance apparatus comprising a memory and a processor, the memory having stored therein instructions executable by the processor, wherein the instructions, when executed by the processor, cause the processor to execute any of the make-up assistance methods described above.

According to yet another aspect of the present disclosure, there is provided a smart mirror comprising the make-up assistance apparatus described above.

According to a further aspect of the present disclosure, there is provided a nonvolatile storage medium having stored therein a computer program which, when executed by a computer, causes the computer to perform the make-up assistance method described above.

In an example, generating makeup modification prompt information comprises: prompting, by voice, a position of the region where the difference is greater than the threshold.

In an example, the make-up region comprises at least one of an eye region, a nose region, a mouth region, a cheek region, an eyebrow region.

BRIEF DESCRIPTION OF THE ACCOMPANYING DRAWINGS

Various other advantages and benefits will become apparent to those of ordinary skill in the art by reading the detailed description of the exemplary embodiments below. The accompanying drawings are only for the purpose of illustrating the exemplary embodiments and are not to be considered as limiting the present disclosure. In the accompanying drawings, the same components are denoted by the same reference signs. In the accompanying drawing.

DETAILED DESCRIPTION

Exemplary embodiments of the present disclosure will be described in more detail below with reference to the accompanying drawings. Although the exemplary embodiments of the present disclosure are shown in the accompanying drawings, it should be understood that the present disclosure may be implemented in various forms and should not be limited by the embodiments set forth here. Rather, these embodiments are provided so that the present disclosure will be more fully understood, and the scope of the present disclosure may be fully conveyed to those skilled in the art.

The embodiments of the present disclosure provide a make-up assistance method.

Figure 1:
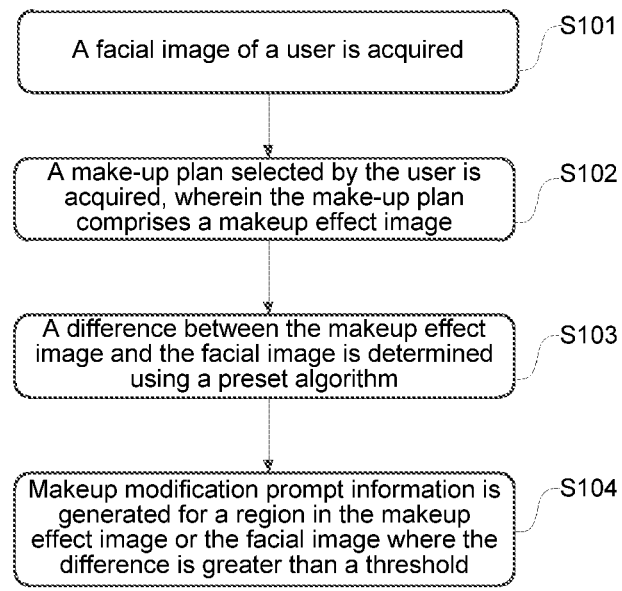
FIG. 1 illustrates a flowchart of a make-up assistance method according to an embodiment of the present disclosure.

FIG. 1 illustrates a flowchart of a make-up assistance method according to an embodiment of the present disclosure. The make-up assistance method according to the present disclosure may be performed by a smart mirror or by other terminal devices having a smart mirror function. The smart mirror and such terminal devices each may be equipped with a display for displaying images and an imaging device for capturing images of users, such as a camera.

In step S101, a facial image of a user is acquired.

For example, the facial image of the user may be acquired using the imaging device to determine a face region (a make-up region) of the user where make-up needs to be performed, comprising, but not limited to, a region where a facial feature is located. In some embodiments, in view of a time required for the make-up, a current facial image of the user may be periodically acquired instead of being acquired in real time. An acquisition period may be set as needed, for example, may be customized by the user, or may be set according to the user's degree of proficiency for the make-up operation. In some embodiments, multiple levels of acquisition periods may be set, for example, 10 seconds, 20 seconds, etc. for selection by the user.

In this step, when the user activates the smart mirror, the smart mirror may acquire the facial image of the user through the camera.

In step S102, a make-up plan selected by the user is acquired, wherein the make-up plan comprises a makeup effect image.

For example, the smart mirror may transmit a facial image acquired in advance or the facial image which is acquired in the above step S101 or information about the facial image to a makeup matching server, and the makeup matching server may perform matching based on the facial image of the user to determine at least one make-up plan which confirms to the user for selection by the user. For example, at least one make-up plan suitable for the user may be determined by performing matching positions and contours of the facial features in the facial image with multiple make-up plans which are pre-stored. In some embodiments, the above matching may also be performed by the smart mirror to determine at least one make-up plan suitable for the user.

In some embodiments, in the matching, the user may also be provided with some filtering options for filtering the make-up plans, so as to help the user to quickly select a desired make-up plan, for example, the user is provided with filtering options related to make-up types such as evening make-up, light make-up, etc.

After the make-up plans for the user are acquired, a make-up plan selected by the user, that is, a make-up plan to be referred to by the user for make-up, is received. In some embodiments, the make-up plan may comprise a description of the make-up steps and a corresponding makeup effect image. Here, the makeup effect image acquired in this step may be a makeup effect image for all make-up steps in the description of the make-up steps or a makeup effect image for a part of the make-up steps in the description of the make-up steps. In some embodiments, the makeup effect image may be a makeup effect image for the entire face or a makeup effect image for a part (for example, eyes) of the face.

In step S103, an image difference between the makeup effect image and the facial image is determined using a preset algorithm.

For example, the difference between a make-up region of the makeup effect image and a make-up region of the facial image may be calculated using a preset algorithm, comprising differences in terms of aspects such as a contour, a color, etc. of an object in the image, to determine whether the make-up effect of the user conforms to the makeup effect image in the make-up plan which is pushed to the user based on the difference. In practical applications, since there is usually a difference between the image acquired through the user's make-up and the makeup effect image, the comparison may be performed based on an interval range, and only when a difference value between the images exceeds the interval range, it is determined that the user's make-up effect does not conform to the makeup effect image.

In addition, when the comparison is performed, a plurality of facial images of the user may be collected in the make-up process, and these images are not necessarily available images, for example, some collected images may not be used for comparison since a region where a facial feature is located is blocked by the user's hand. In this regard, facial images which meet requirements may firstly be filtered from the plurality of facial images of the user, for example, the facial images of the user may be filtered by conditions of, for example, whether a position of the face is located in a central region of the image, whether the facial features of the face are clear etc. Specific filtering conditions may be customized, and are not limited in the present disclosure.

In some embodiments, the process and results of the comparison may be displayed in the smart mirror, wherein the results of the comparison are presented on a screen in a partition presentation manner. In some other embodiments, the comparison calculation may be performed in the background, and the current facial image of the user is presented in the smart mirror. When there is an image difference, a region where the image difference occurs is marked and/or prompted in the current facial image of the user to inform the user that there is a difference between makeup in the region and the selected makeup effect image. In this regard, the user may also be provided with different mode selections, and a corresponding reference comparison mode is selected according to the user's usage habits.

In step S104, makeup modification prompt information is generated for a region in the makeup effect image or the facial image where the difference is greater than a threshold.

According to the comparison result of step 103, when the image difference between a certain region of the facial image and a respective region of the makeup effect image is greater than the threshold, the smart mirror may generate makeup modification prompt information, wherein the makeup modification prompt information may be used to not only inform the user of a region where an actual make-up effect does not conform to the desired make-up effect, but also inform the user of how to modify the current makeup effect to the effect of the selected makeup effect image. For example, the smart mirror may update the acquired facial image periodically or in real time, perform data comparison and analysis based on the updated facial image of the user to obtain a corresponding makeup modification step, and present the makeup modification step in the smart mirror in, for example, a form of prompt information. The user may select to view the prompt information or select to ignore the prompt information.

It may be seen from the above implementation that with the make-up assistance method according to the embodiment of the present disclosure, the user may obtain make-up plans matched with the user through the smart mirror, and select a make-up plan needed by the user to perform make-up. In the make-up process, the smart mirror may update the facial image of the user during the make-up periodically or in real time, compare the facial image with a makeup effect image in the make-up plan selected by the user, and provide makeup modification prompt information, to inform the user of deficiencies of the current makeup, so that the user may adjust the current makeup in a targeted manner to ensure that the user's make-up effect is consistent with the makeup effect of the selected make-up plan. With the embodiments of the present disclosure, the user may not only select the make-up effect to be referred to, but also may be provided with a modification recommendation by the smart mirror in real time according to the user's make-up effect in the make-up process, thus helping the user to make the make-up more efficiently.

Although the various steps of the method are described in a particular order in the above embodiments, it should be appreciated by those skilled in the art that embodiments of the present disclosure are not limited thereto. The steps of the method according to the embodiments of the present disclosure may be performed in another order as needed. For example, after step S102 is performed, step S101 may be performed in real time, after a predetermined time, or periodically to update the facial image of the user. In this way, actual make-up effects of the user in different phases may be obtained for comparison with the makeup effect image in the desired make-up plan selected by the user in step S103. In this case, after the user selects the make-up plan, it may be considered by the smart mirror that the user starts to perform make-up according to the selected make-up plan, and thus enables a make-up mode and starts to collect the current facial image of the user. In this case, before step S102 is performed, the makeup matching server may determine a plurality of make-up plans for selection by the user according to the facial image provided to the makeup matching server in advance (for example, before the present method is performed).

Figure 2:
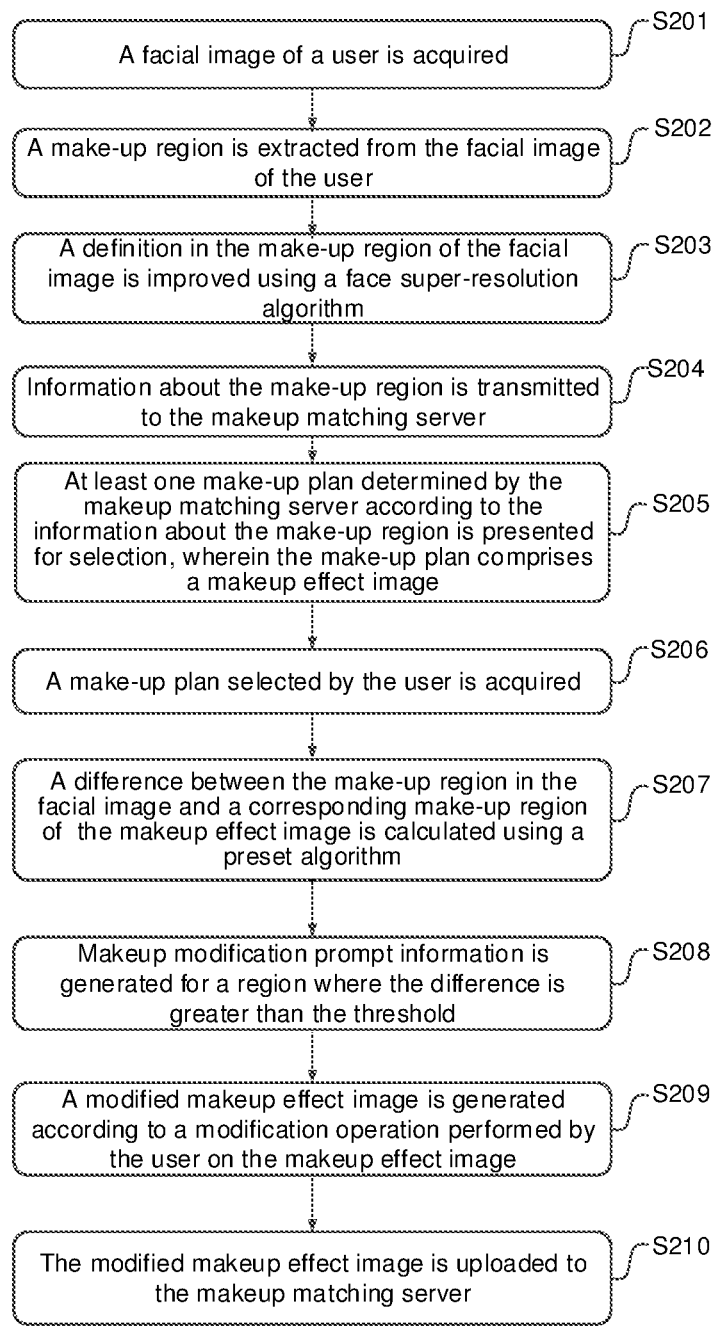
FIG. 2 illustrates a flowchart of a make-up assistance method according to another embodiment of the present disclosure.

FIG. 2 illustrates a flowchart of a make-up assistance method according to another embodiment of the present disclosure.

In step S201, a facial image of a user is acquired. For example, the facial image of the user may be acquired in the same manner as that in the above step S101.

In step S202, a make-up region is extracted from the facial image of the user.

For example, a smart mirror or a smart terminal having a smart mirror function may not perform a matching operation, but performs feature extraction on the identified facial image of the user to obtain a make-up region of the user. The make-up region may comprise, but not limited to, a facial region of the user, such as an eye region, a nose region, a mouth region, a cheek region, and an eyebrow region etc. Information about the make-up region, for example, data related to contours and a relative positional relationship of respective make-up regions, may be transmitted to a makeup matching server for determining make-up plans by performing matching, which may reduce a data calculation pressure of the smart mirror or the smart terminal, make reasonable use of computing resources of the makeup matching server, improve matching efficiency, and enable the user to quickly obtain a make-up plan matched with facial features.

In step S203, a definition in the make-up region of the facial image is improved using a face super-resolution algorithm.

For example, in order for the makeup matching server to provide more accurate make-up plans, the smart mirror or the smart terminal may transmit a higher definition image in the make-up region to the makeup matching server. For example, the make-up region may be enlarged using the face super-resolution algorithm to obtain a face make-up region with a higher definition. A low-resolution facial image may be restored to a high-resolution facial image using the face super-resolution algorithm, so that detail parts in the facial image may be easily distinguished, which enables the make-up region in the face to be more accurately obtained by segmentation. For example, the face super-resolution algorithm may comprise facial image de-noising, facial image magnification selection, facial feature point extraction, make-up information extraction, and facial skin quality assessment. The facial image de-noising may provide two parameters which are 0 and 1. The facial image magnification selection may provide four parameters which are 2 times, 4 times, 6 times and 8 times. In some embodiments, the smart mirror or the smart terminal may provide different magnifications of the facial image for selection by the user, for example, 2 times, 4 times, 8 times, etc., and the higher the magnification, the larger the amount of calculation required, and the longer the calculation time required. In some embodiments, in order to ensure a fast speed of a response to the user, a magnification of 2 times may be set by default, and the user may select a desired magnification according to his/her own needs. The facial feature point extraction may comprise the extraction of information about the facial features. The make-up information extraction may comprise determining a positional relationship of the facial features by performing matching. The facial skin quality assessment may comprise generation of a make-up plan based on skin quality.

In step S204, information about the make-up region is transmitted to the makeup matching server. For example, the information about the make-up region of which the definition is improved, for example, information indicating the contours and the relative positional relationship of the facial features, is transmitted to the makeup matching server. The makeup matching server may determine make-up plans by performing matching using the information about the make-up region, to obtain at least one make-up plan suitable for the user to be transmitted to the smart mirror for selection by the user.

In step S205, at least one make-up plan determined by the makeup matching server according to the information about the make-up region is presented for selection. The make-up plan determined by the makeup matching server may comprise a makeup effect image. In some embodiments, the make-up plan may also comprise a make-up step for the makeup effect image. The at least one make-up plan is presented to the user after the smart mirror or the smart terminal receives the at least one make-up plan provided by the makeup matching server. The user may browse the at least one make-up plan through a presentation interface and select a desired make-up plan therefrom.

In step S206, a make-up plan selected by the user is acquired. For example, the make-up plan selected by the user may be acquired in the same manner as that in the above step S102.

In step S207, a difference between the make-up region of the facial image and a respective make-up region of the makeup effect image is calculated using a preset algorithm.

This comparison process may be regarded as a process of calculating a similarity between patterns of corresponding regions in the two images. For example, calculation of similarity may be performed between the make-up region identified from the facial image based on a contour of the face, and a corresponding make-up region in the makeup effect image. For example, the makeup effect image may also comprise an eye region, a nose region, a mouth region, a cheek region, and an eyebrow region. In step 202, the eye region, the nose region, the mouth region, the cheek region, and the eyebrow region of the acquired face image may be identified. In step 207, the eye region of the facial image is compared with an eye region of the makeup effect image to determine a difference therebetween, for example, in terms of at least one of feature, texture, or color. Similarly, the nose region of the facial image may be compared with a nose region of the makeup effect image, the mouth region of the facial image may be compared with a mouth region of the makeup effect image, and so on, to determine a difference between the facial image and the makeup effect for each facial feature of the face.

For example, the contour of the face in the image may be identified using feature points extracted from the image using a facial feature library. The facial feature library comprises, for example, a dlib library, which is a computer language toolkit containing machine learning algorithms. The face in the image may be detected using the dlib library to obtain the contour of the face. A make-up region in the face may further be extracted from the contour of the face using an Active Shape Model (ASM) algorithm, wherein the ASM is an algorithm based on a point distribution model. The make-up region identified from the facial image may be compared with the makeup effect image to calculate at least one of a feature difference value, a texture difference value, or a color difference value therebetween. The feature difference value may be calculated using a sift feature extraction algorithm, the texture difference value may be calculated using Gabor transform, and the color difference value may be calculated using a chromaticity histogram. The above description merely provides the exemplary algorithm for calculating the image difference described above, and other algorithms for calculating the image difference are also feasible in the present embodiment. The feature difference value, the texture difference value and the color difference value which are calculated above may be calculated through vectorization using a Euclidean distance, and results thereof may represent a degree of difference between the corresponding make-up regions in the two images.

It may be determined whether the facial image of the user which has been made up has reached the makeup effect in the selected makeup effect image by determining whether the degree of difference is greater than a threshold, and if so, the flow of the present disclosure may directly end; otherwise, step 208 is performed. Each of the makeup regions may have a respective threshold. Further, different thresholds may be set for different types of differences respectively. For example, a threshold for feature difference value, a threshold for texture difference value, and a threshold for color difference value may be set for the eye region. Of course, the same threshold may also be set for a plurality of makeup regions to simplify the calculation, which will not be repeated here.

In step S208, makeup modification prompt information is generated for a region where the difference is greater than the threshold.

In this step, when the generated makeup modification prompt information is presented to the user, the user may also be prompted in various manners, for example, the make-up region to be modified may be highlighted in the makeup effect image or the facial image to visually prompt the user, and a position of a make-up region where the image difference is greater than the threshold may be broadcast by voice to acoustically prompt the user. In this regard, a manner in which the generated prompt information is presented is not specifically limited in the present embodiment. In some embodiments, prompt information about a degree of difference between the facial image and the makeup effect image may also be given, for example, information about whether a color of a cheek in the facial image is darker or lighter than that in the makeup effect image, information about whether a width of eyebrows in the facial image is greater than or less than that in the makeup effect image etc., to provide more accurate makeup modification recommendation.

It has been described in detail above that after the user selects a reference effect image for make-up, the facial image of the user which is collected in the make-up process is compared with the reference effect image, that is, make-up effect of the user is compared with the reference effect image in real time, and a specific region where there are deficiencies is prompted to help the user in modifying the makeup in time, so as to achieve the best make-up effect.

However, in some cases, the user is not satisfied with all the make-up plans recommended by the makeup matching server. To this end, the following steps S209 and 210 may be performed to provide the user with a modification function for the make-up plan, so as to meet the user's personalized needs for makeup.

In step S209, a modified makeup effect image is generated according to a modification operation performed by the user on the makeup effect image. For example, in an interface presented by the smart mirror or the smart terminal to the user, the user may select a modification operation to be performed on the make-up plan, and a corresponding simulation tool is provided to the user through a modification toolbar provided by a system, so as to realize modification on the makeup effect image provided by the make-up plan. After the modification is completed by the user, the modified makeup effect image is generated.

In step S210, the modified makeup effect image is uploaded to the makeup matching server. For example, the makeup effect image may be stored locally according a confirmation operation of the user. In some embodiments, the makeup effect image may also be uploaded to the makeup matching server. The makeup matching server may directly provide, according to the modified makeup effect image fed back by the user, the makeup effect image when the user performs make-up later, and may also use the makeup effect image as a training sample to train a matching model of make-up plans in the makeup matching server, so as to improve the accuracy of determining the make-up plans by the makeup matching server by performing matching.

The embodiments of the present disclosure provide a make-up assistance apparatus, which is not limited to being provided in a smart mirror or another smart terminal having a mirror function, and the make-up assistance apparatus may perform the make-up assistance method described above. For ease of reading, details of the embodiments of the make-up assistance method described above will not be described one by one in the embodiment of the apparatus.

Figure 3:
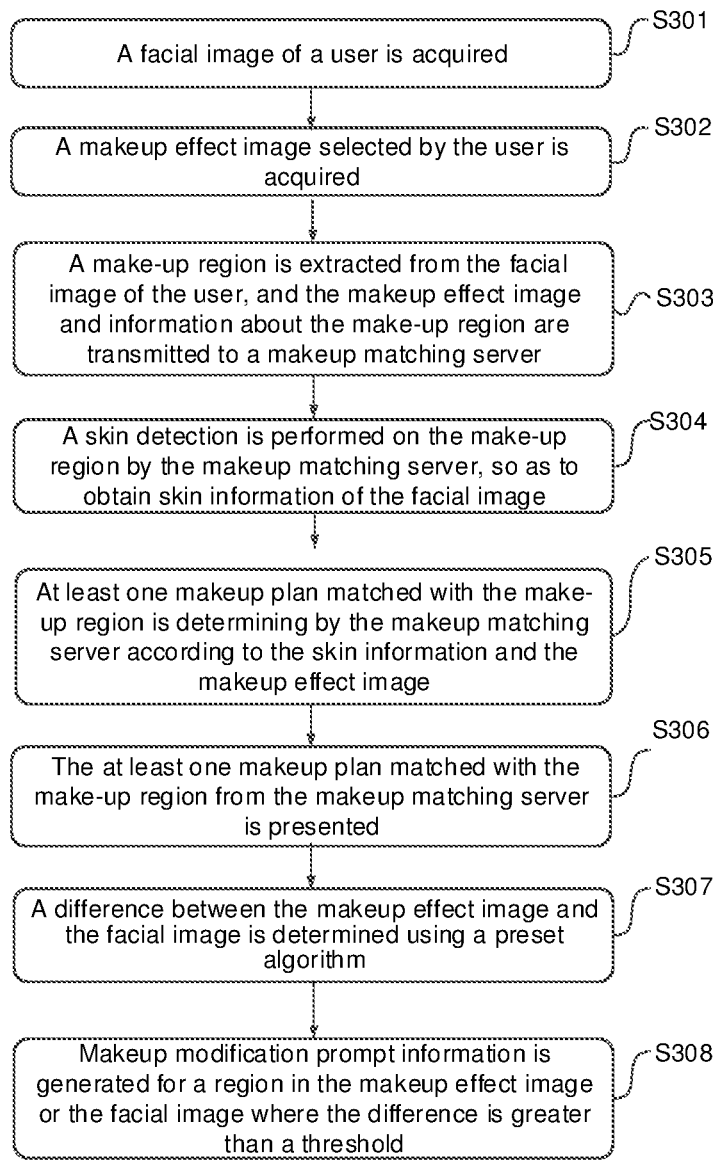
FIG. 3 illustrates a flowchart of a make-up assistance method according to another embodiment of the present disclosure.

FIG. 3 illustrates a flowchart of a make-up assistance method according to another embodiment of the present disclosure.

In step S301, a facial image of a user is acquired. For example, the facial image of the user may be acquired in the same manner as that in the above step S101.

In step S302, a makeup effect image selected by the user is acquired.

For example, a makeup effect image may be an image obtained by applying one or more makeup effect such as smoky makeup, evening makeup, light makeup, and the like to the facial image of the user. A makeup effect image may be selected by a user from a plurality of makeup effect images. The makeup effect image selected by the user may be used as a reference in make-up process. In some embodiments, the makeup effect image may be a makeup effect image for the entire face or a makeup effect image for a part (for example, eyes) of the face.

In step S303, a make-up region from the facial image of the user is extracted, and the makeup effect image and information about the make-up region are transmitted to a makeup matching server.

For example, a smart mirror or a smart terminal having a smart mirror function may not perform a matching operation, but performs feature extraction on the identified facial image of the user to obtain a make-up region of the user. The make-up region may include, but not limited to, a facial region of the user, such as an eye region, a nose region, a mouth region, a cheek region, and an eyebrow region etc. The makeup effect image and information about the make-up region may be transmitted to a makeup matching server for determining make-up plans by performing matching, which may reduce a data calculation pressure of the smart mirror or the smart terminal, make reasonable use of computing resources of the makeup matching server, improve matching efficiency, and enable the user to quickly obtain a make-up plan matched with facial features and the makeup effect image.

In step S304, a skin detection is performed on the make-up region by the makeup matching server, so as to obtain skin information of the facial image.

For example, the skin detection includes a skin color detection and skin spot detection.

The skin color detection is an analysis and calculation process of human skin color pixels, which may accurately identify skin areas. The skin color detection includes a skin color detection based on color space, a method based on spectral feature and a method based on skin color reflection model. In the skin color detection, transforming of the color space is performed, and then a skin color model is built. The skin spot detection is intended to finding an area in a facial image that has a feature different from that of a surrounding area. The feature include illumination, color and grayscale. For example, the skin spot detection is intended to detect areas in the facial image that have a pixel grayscale value larger or smaller than that of surrounding areas, such as detecting by SimpleBlobDetector.

The makeup matching server performs the skin color detection and the skin spot detection on the make-up region, so as to obtain a skin color information and a skin spot of the facial image.

In step S305, at least one makeup plan matched with the make-up region is determining by the makeup matching server according to the skin information and the makeup effect image.

For example, the makeup matching server may perform matching based on the makeup area of the face image according to the skin information and the makeup effect image obtained in above steps, so that the makeup matching server may determine at least one makeup plan conforming to the user requirement for the user to select. For example, the makeup plan may include cosmetics. For example, according to the difference between the skin color information obtained from the facial image and a skin color information of the makeup effect image, a base cosmetic having a color complementary to the skin color information obtained from the facial image is selected from a plurality of base cosmetics each having a color. If the user selects the base cosmetic, the difference of the skin color between the facial image and the makeup effect image may be reduced. For example, the skin color information includes at least one of a grayscale of a pixel and a color of a pixel, and the base cosmetic includes at least one of a foundation and a blush. For example, a concealer cosmetic is selected from a plurality of concealer cosmetics according to a pixel feature of the skin spot and a pixel feature of a skin around the skin spot. If the user selects the concealer cosmetic, the difference of the skin spot between the facial image and the makeup effect image may be reduced.

In step S306, the at least one makeup plan matched with the make-up region from the makeup matching server is presented.

After the makeup matching server determines the at least one makeup plan matched with the make-up region, the makeup matching server may transmit the at least one makeup plan to the smart mirror, and the smart mirror presents the at least one makeup plan to the user.

In step S307, an image difference between the makeup effect image and the facial image is determined using a preset algorithm. For example, the image difference may be determined in the same manner as that in the above step S103.

In step S308, makeup modification prompt information is generated for a region in the makeup effect image or the facial image where the difference is greater than a threshold. For example, makeup modification prompt information may be generated in the same manner as that in the above step S104.

Figure 4:
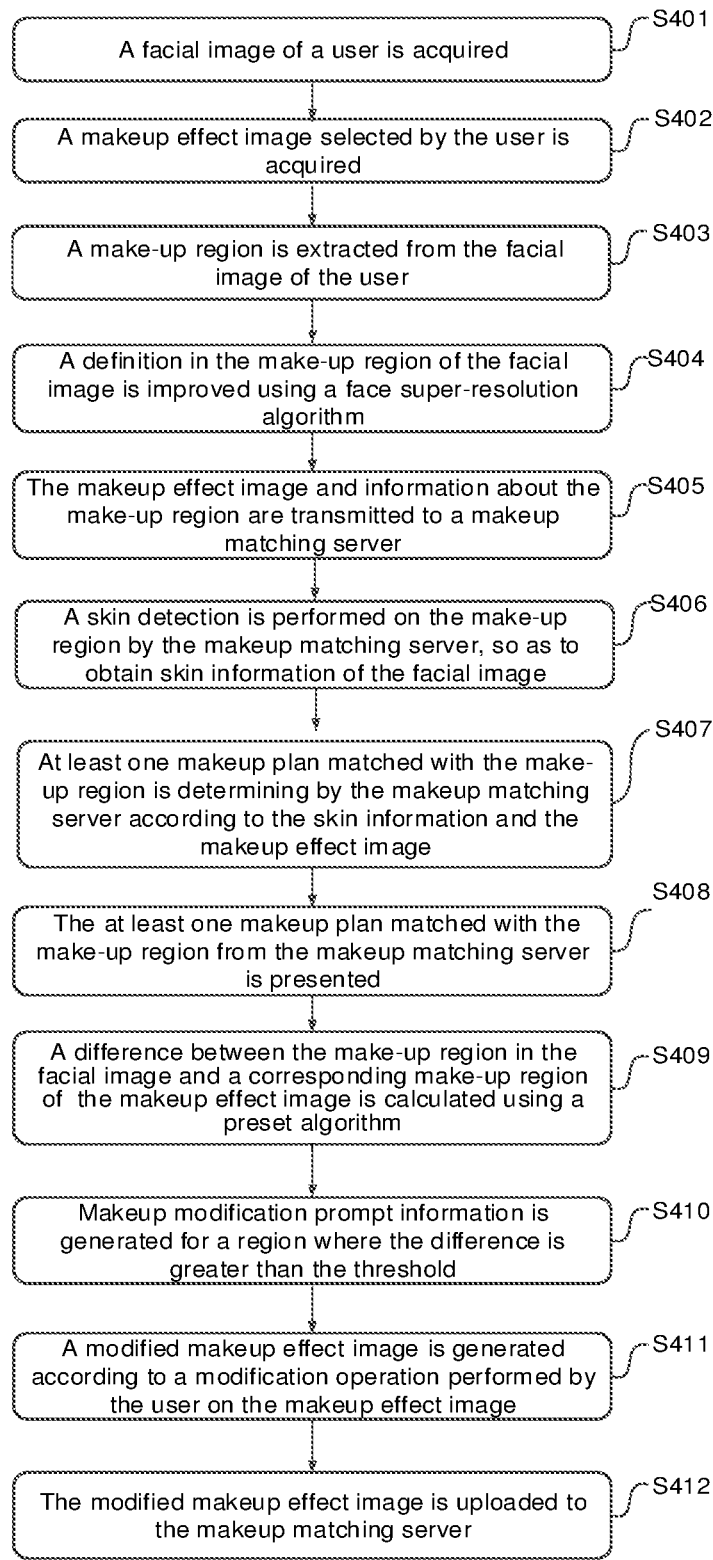
FIG. 4 illustrates a flowchart of a make-up assistance method according to another embodiment of the present disclosure.

FIG. 4 illustrates a flowchart of a make-up assistance method according to another embodiment of the present disclosure.

As shown in FIG. 4, the method includes steps S401 to S412. The steps S401, S403 to S404 and S409 to S412 are respectively performed in the same manner as S201, S202 to S203 and S207 to S210 in the above steps in FIG. 2.

In step S401, a facial image of a user is acquired.

In step S402, a makeup effect image selected by the user is acquired.

For example, a makeup effect image may be an image obtained by applying one or more makeup effect such as smoky makeup, evening makeup, light makeup, and the like to the facial image of the user. A makeup effect image may be selected by a user from a plurality of makeup effect images. The makeup effect image selected by the user may be used as a reference in make-up process. In some embodiments, the makeup effect image may be a makeup effect image for the entire face or a makeup effect image for a part (for example, eyes) of the face.

In step S403, a make-up region is extracted from the facial image of the user.

In step S404, a definition in the make-up region of the facial image is improved using a face super-resolution algorithm.

In step S405, the makeup effect image and information about the make-up region are transmitted to a makeup matching server.

The makeup effect image and information about the make-up region may be transmitted to a makeup matching server for determining make-up plans by performing matching, which may reduce a data calculation pressure of the smart mirror or the smart terminal, make reasonable use of computing resources of the makeup matching server, improve matching efficiency, and enable the user to quickly obtain a make-up plan matched with facial features and the makeup effect image.

In step S406, a skin detection is performed on the make-up region by the makeup matching server, so as to obtain skin information of the facial image.

For example, the skin detection includes a skin color detection and skin spot detection.

The skin color detection is an analysis and calculation process of human skin color pixels, which may accurately identify skin areas. The skin color detection includes a skin color detection based on color space, a method based on spectral feature and a method based on skin color reflection model. In the skin color detection, transforming of the color space is performed, and then a skin color model is built. The skin spot detection is intended to finding an area in a facial image that has a feature different from that of a surrounding area. The feature include illumination, color and grayscale. For example, the skin spot detection is intended to detect areas in the facial image that have a pixel grayscale value larger or smaller than that of surrounding areas, such as detecting by SimpleBlobDetector.

The makeup matching server performs the skin color detection and the skin spot detection on the make-up region, so as to obtain skin color information and a skin spot of the facial image.

In step S407, at least one makeup plan matched with the make-up region is determining by the makeup matching server according to the skin information and the makeup effect image.

For example, the makeup matching server may perform matching based on the makeup area of the face image according to the skin information and the makeup effect image obtained in above steps, so that the makeup matching server may determine at least one makeup plan conforming to the user requirement for the user to select. For example, the makeup plan may include cosmetics. For example, according to the difference between the skin color information obtained from the facial image and a skin color information of the makeup effect image, a base cosmetic having a color complementary to the skin color information obtained from the facial image is selected from a plurality of base cosmetics each having a color. If the user select the base cosmetic, the difference of the skin color between the facial image and the makeup effect image may be reduced. For example, the skin color information includes at least one of a grayscale of a pixel and a color of a pixel, and the base cosmetic includes at least one of a foundation and a blush. For example, a concealer cosmetic is selected from a plurality of concealer cosmetics according to a pixel feature of the skin spot and a pixel feature of a skin around the skin spot. If the user select the concealer cosmetic, the difference of the skin spot between the facial image and the makeup effect image may be reduced.

In step S408, the at least one makeup plan matched with the make-up region from the makeup matching server is presented.

After the makeup matching server determines the at least one makeup plan matched with the make-up region, the makeup matching server may transmit the at least one makeup plan to the smart mirror, and the smart mirror presents the at least one makeup plan to the user.

In step S409, a difference between the make-up region in the facial image and a corresponding make-up region of the makeup effect image is calculated using a preset algorithm.

In step S410, makeup modification prompt information is generated for a region where the difference is greater than the threshold.

In step S411, a modified makeup effect image is generated according to a modification operation performed by the user on the makeup effect image In step S412, the modified makeup effect image is uploaded to the makeup matching server.

Figure 5:
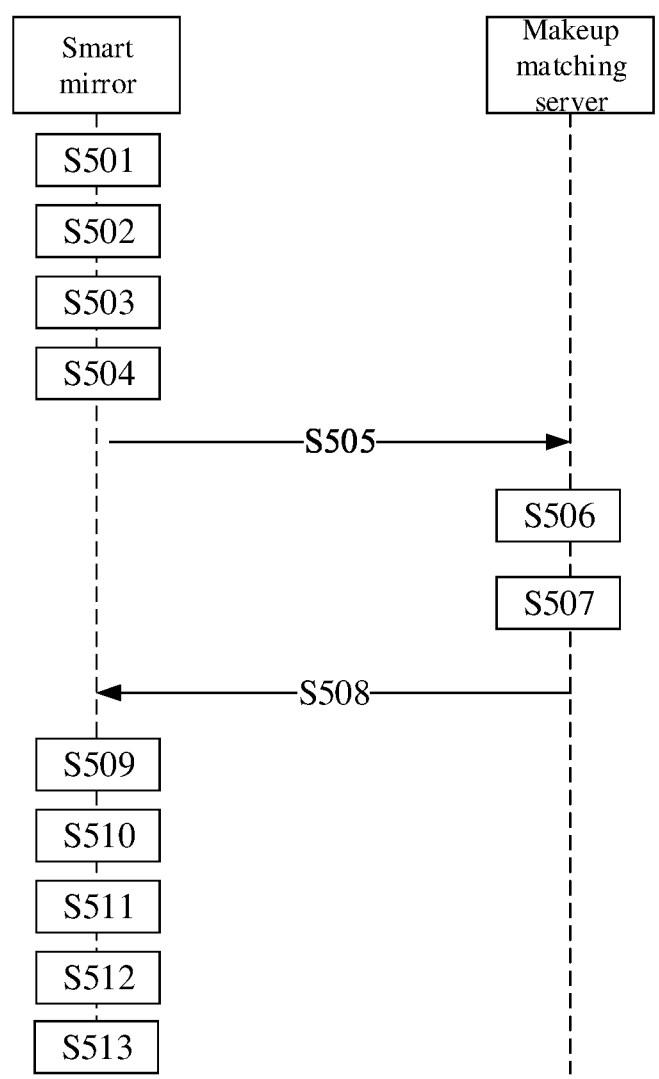
FIG. 5 illustrates a schematic of a make-up assistance method according to another embodiment of the present disclosure.

FIG. 5 illustrates a schematic of a make-up assistance method according to another embodiment of the present disclosure.

As shown in FIG. 5, the method includes steps S501 to S513. The steps S501 to S507 and S509 to S513 are respectively performed in the same manner as S401 to S407 and S408 to S412 in the above steps in FIG. 4.

In step S501, a smart mirror acquires a facial image of a user.

In step S502, the smart mirror acquires a makeup effect image selected by the user.

In step S503, the smart mirror extracts a make-up region from the facial image of the user.

In step S504, the smart mirror improves a definition in the make-up region of the facial image using a face super-resolution algorithm.

In step S505, the smart mirror transmits the makeup effect image and information about the make-up region to a makeup matching server.

In step S506, the makeup matching server performs a skin detection on the make-up region, so as to obtain skin information of the facial image.

In step S507, the makeup matching server determines at least one makeup plan matched with the make-up region according to the skin information and the makeup effect image.

In step S508, the makeup matching server transmits the at least one makeup plan to the smart mirror.

In step S509, the smart mirror presents the at least one makeup plan.

In step S510, the smart mirror calculates a difference between the make-up region in the facial image and a corresponding make-up region of the makeup effect image using a preset algorithm.

In step S511, the smart mirror generates makeup modification prompt information for a region where the difference is greater than the threshold.

In step S512, the smart mirror generates a modified makeup effect image according to a modification operation performed by the user on the makeup effect image In step S513, the smart mirror uploads the modified makeup effect image to the makeup matching server.

Figure 6:
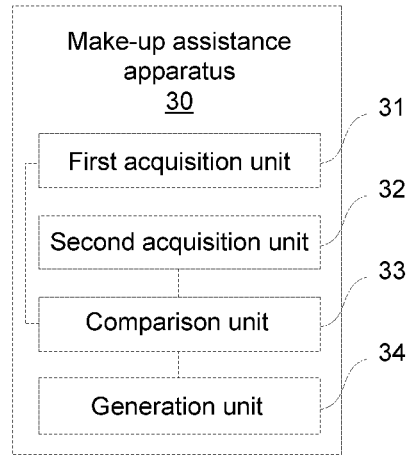
FIG. 6 illustrates a schematic structural diagram of a make-up assistance apparatus according to an embodiment of the present disclosure.

FIG. 6 illustrates a schematic structural diagram of a make-up assistance apparatus according to an embodiment of the present disclosure. As shown in FIG. 6, the make-up assistance apparatus 30 comprises a first acquisition unit 31, a second acquisition unit 32, a comparison unit 33, and a generation unit 34.

The first acquisition unit 31 is configured to acquire a current facial image of a user.

The second acquisition unit 32 is configured to acquire a makeup effect image of a make-up plan selected by the user.

The comparison unit 33 is configured to determine an image difference between the makeup effect image and the facial image using a preset algorithm.

The generation unit 34 is configured to generate makeup modification prompt information for a region where the image difference is greater than a threshold.

Figure 7:
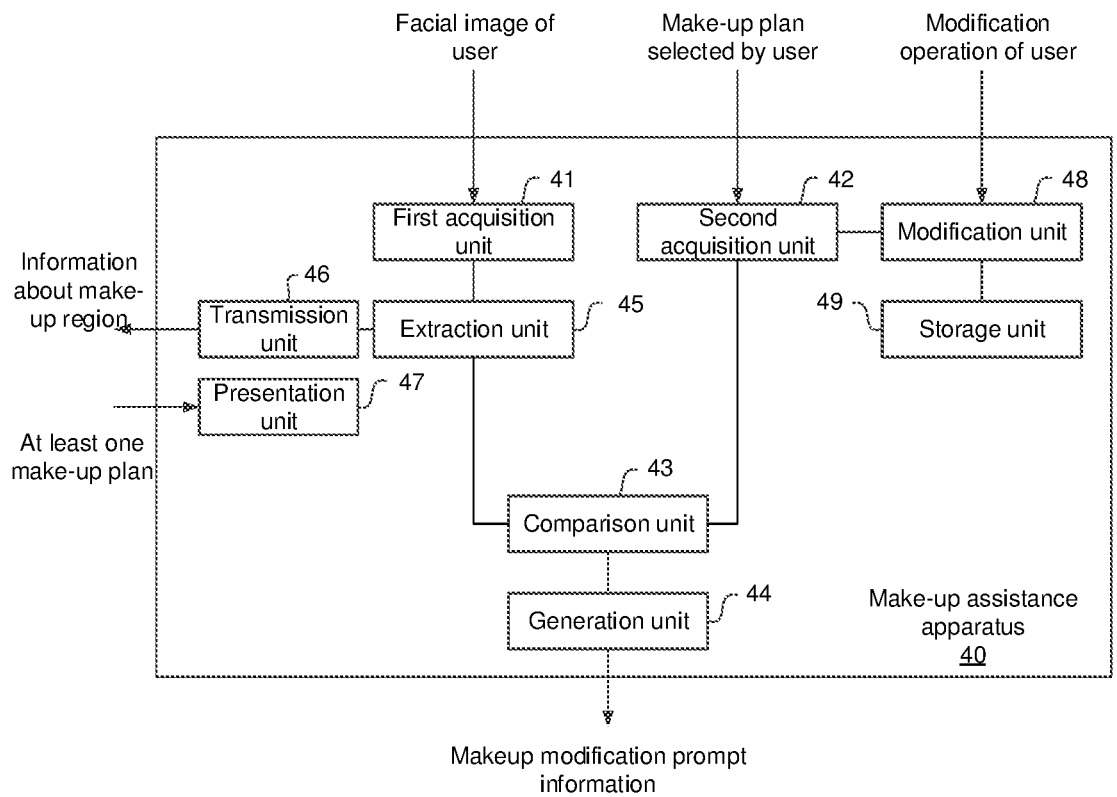
FIG. 7 illustrates a schematic structural diagram of a make-up assistance apparatus according to another embodiment of the present disclosure.

FIG. 7 illustrates a schematic structural diagram of a make-up assistance apparatus according to another embodiment of the present disclosure.

As shown in FIG. 7, the make-up assistance apparatus 40 comprises a first acquisition unit 41, a second acquisition unit 42, a comparison unit 43, and a generation unit 44. The first acquisition unit 41, the second acquisition unit 42, the comparison unit 43, and the generation unit 44 may be implemented by the first acquisition unit 31, the second acquisition unit 32, the comparison unit 33, and the generation unit 34 described above respectively. In addition thereto, the make-up assistance apparatus 40 further comprises an extraction unit 45, a transmission unit 46, a presentation unit 47, a modification unit 48, and a storage unit 49.

The extraction unit 45 is configured to extract a face make-up region from the facial image of the user before the second acquisition unit 32 acquires the makeup effect image of the make-up plan selected by the user.

The transmission unit 46 is configured to transmit the face make-up region extracted by the extraction unit 45 to a makeup matching server.

The presentation unit 47 is configured to present at least one make-up plan determined by the makeup matching server by performing matching according to the face make-up region.

In some embodiments, the extraction unit 45 may further enlarge the face make-up region using a face super-resolution algorithm to obtain a high-definition face make-up region.

In some embodiments, the comparison unit 43 may determine an image difference between the makeup effect image and the facial image by calculating at least one of a feature difference value, a texture difference value, or a color difference value between the makeup effect image and the make-up region in the facial image using a preset algorithm.

In some embodiments, the comparison unit 43 comprises: an identification module configured to identify make-up regions in the makeup effect image and the facial image using a feature identification algorithm; and a calculation module configured to calculate a feature difference image, a texture difference value, and a color difference value between the corresponding make-up region in the facial image and a respective make-up region in the makeup effect image which are identified by the identification module.

The modification unit 48 is configured to receive a modification operation to be performed by the user on the makeup effect image acquired by the second acquisition unit 42, and generate a modified makeup effect image.

The storage unit 49 is configured to store the makeup effect image modified by the modification unit 48 in the makeup matching server.

In some embodiments, the generation unit 44 comprises at least one of a difference display module configured to highlight the make-up region to be modified in the makeup effect image; or a difference broadcast module configured to prompt, by voice, a position of the make-up region where the image difference is greater than the threshold.

Figure 8:
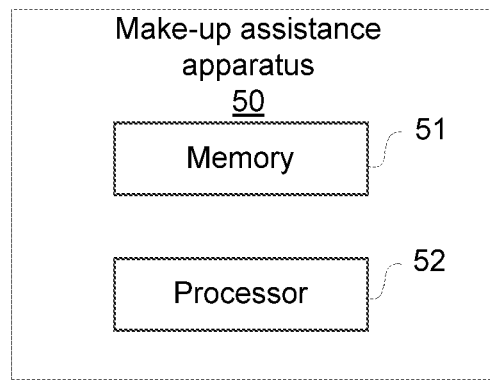
FIG. 8 illustrates a schematic structural diagram of a make-up assistance apparatus according to still another embodiment of the present disclosure.

FIG. 8 illustrates a schematic structural diagram of a make-up assistance apparatus according to still another embodiment of the present disclosure. As shown in FIG. 8, the make-up assistance apparatus 50 comprises a memory 51 and a processor 52, the memory 51 having stored therein instructions executable by the processor 52, wherein the instructions, when executed by the processor 52, cause the processor 52 to perform the make-up assistance method according to any of the embodiments described above, for example, any of the make-up assistance methods described above with reference to FIGS. 1 and 2.

The embodiments of the present disclosure further provide a smart mirror having provided therein the make-up assistance apparatus according to any of the embodiments described above, for example, any of the make-up assistance apparatuses described above with reference to FIG. 6 or FIG. 7.

Figure 9:
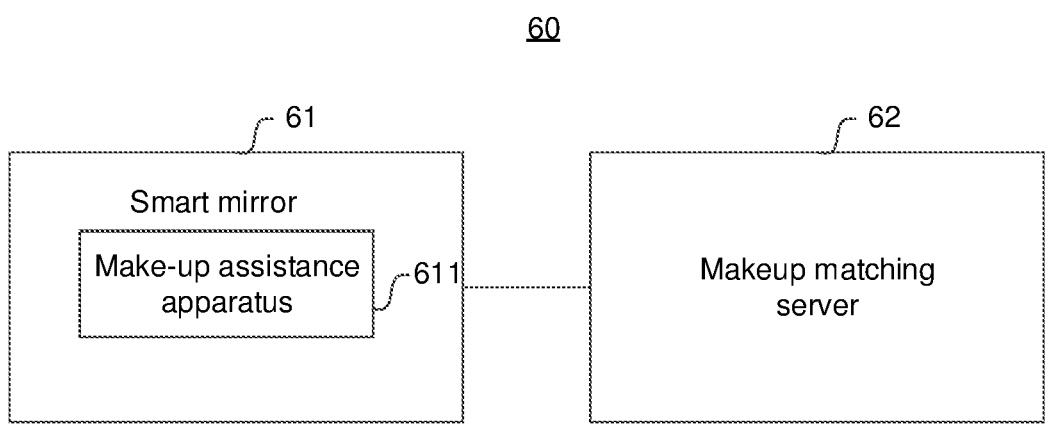
FIG. 9 illustrates a schematic structural diagram of a make-up assistance system according to an embodiment of the present disclosure.

FIG. 9 illustrates a schematic structural diagram of a make-up assistance system according to an embodiment of the present disclosure. As shown in FIG. 9, the make-up assistance system 60 comprises a smart mirror 61 and a makeup matching server 62. The smart mirror 61 comprises a make-up assistance apparatus 611. The make-up assistance apparatus 611 may be implemented by the make-up assistance apparatus according to any of the embodiments described above, for example, any of the make-up assistance apparatuses described above with reference to FIG. 6 or FIG. 7. The smart mirror 61 is communicatively coupled to the makeup matching server 62 through, for example, but not limited to, a wired connection and a wireless connection, to realize information transfer between the make-up assistance apparatus 611 and the makeup matching server 62, for example, transmission of the facial image (for example, information related to the make-up region in the facial image) to the makeup matching server 62 and reception of at least one make-up plan generated by the makeup matching server 62 based on the facial image from the makeup matching server 62.

For example, the make-up assistance apparatus 611 in the smart mirror 61 may comprise a processor and a memory, wherein the memory has stored therein one or more computer instructions, which are executed by the processor to perform the steps of the make-up assistance method described above, for example, shown in FIG. 1 or FIG. 2. The smart mirror may be a product in a form of a mirror in practical applications, or may be a smart mirror application provided in a smart terminal, for example, a mirror application in a mobile phone, through which the steps of the make-up assistance method described above are implemented. In some embodiments, the smart mirror 61 may further comprise an imaging device such as a camera for capturing a facial image. The smart mirror 61 may further comprise an interactive apparatus, for example, a touch screen, a keyboard, a mouse, a microphone, a display screen, and a speaker etc., and the user may input information to the smart mirror 61 through the interactive apparatus to, for example, select a make-up plan and modify a make-up plan, etc., and the smart mirror 61 may provide information to the user through the interactive apparatus to, for example, present at least one make-up plan for selection by the user, present an actual make-up effect to the user in a make-up process of the user, provide makeup modification prompt information to the user, and guide the user to modify the make-up plan etc.

The embodiments of the present disclosure further provide a computer readable storage medium having stored thereon a computer program which, when executed by a computer, causes the computer to perform the make-up assistance method according to any of the embodiments described above, for example, the make-up assistance method described above with reference to FIG. 1 or FIG. 2.

In summary, with the make-up assistance method and apparatus and the smart mirror according to the embodiments of the present disclosure, the user may acquire make-up plans which are matched with the user by the smart mirror or another smart terminal through the smart mirror or the other smart terminal, and select a plan desired by the user for make-up. In the make-up process, the smart mirror may acquire the facial image of the user in the make-up process, compare the facial image with an makeup effect image in the make-up plan selected by the user, and provide makeup modification prompt information to inform the user of deficiencies of the current makeup, so that the user may adjust the current makeup in a targeted manner to ensure that the make-up effect of the user is consistent with the makeup effect of the selected make-up plan. With the present disclosure, the user may select the make-up effect to be referred to, and also may be provided with a modification recommendation by the smart mirror in real time according to the user's make-up effect in the make-up process, thus helping the user to make the make-up more efficiently. At the same time, since the make-up plans are acquired by the makeup matching server by performing matching, the terminal used by the user may quickly provide a suitable make-up plan to the user without configuring a lot of computing resources. In addition, the present disclosure further has a modification function for providing the user with a make-up plan according to the user's personalized needs, so that the user may further modify the make-up effect image according to his/her preference, and perform make-up based on the make-up effect image, thereby improving the user's application experience.

It can be understood that related features in the above method and apparatus can be known with reference to each other. In addition, "first", "second", etc. in the above embodiments are used to distinguish the embodiments from each other, and do not represent preferred and non-preferred embodiments.

It can be clearly understood by those skilled in the art that for the convenience and brevity of the description, specific operating processes of the system, the apparatus and the unit described above can be known with reference to the corresponding processes in the method embodiment described above, and details thereof will not be described here again.

The present application is described with reference to the flowcharts and/or block diagrams of the methods, devices (systems) and computer program products according to the embodiments of the present application. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture including instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed in the computer or other programmable devices provide a step of implementing functions specified in one or more flows in the flowcharts and/or one or more blocks in the block diagrams.

In a typical configuration, a computing device comprises one or more processors (for example, CPUs), input/output interfaces, network interfaces, and memories.

The memory may comprise a RAM, and/or a non-volatile memory, such as a ROM or a flash RAM. The memory is an example of the computer readable medium.

The computer readable media, including both permanent and non-persistent media, and removable and non-removable media, may store information through any method or technology. The information may be computer readable instructions, data structures, program modules, or other data. Examples of the computer storage medium comprise, but not limited to, a Phase Change Memory (PRAM), a Static Random Access Memory (SRAM), a Dynamic Random Access Memory (DRAM), other types of RAMs, ROMs, an Electrically Erasable Programmable Read Only Memory (EEPROM), a flash memory or other memory technology, a Compact Disk-Read Only Memory (CD-ROM), a Digital Versatile Disk (DVD) or other optical storage, a cartridge-type magnetic tape, a magnetic tape storage or other magnetic storage devices or any other non-transportable media for storing information which may be accessed by a computing device. As defined herein, the computer readable medium does not comprise transitory media, such as modulated data signals and carriers.

It is also to be illustrated that the terms "comprises" or "comprising" or any other variations are intended to encompass a non-exclusive inclusion, so that a process, method, article, or device, including a series of elements, not only comprises those elements, but also comprises other elements which are not explicitly listed, or elements which are inherent to such a process, method, article, or device. An element defined by a phrase "comprising a . . . " without further limitation does not exclude the existence of additional identical elements in the process, method, article, or device which comprises the element.

The above description is only the embodiments of the present application and is not intended to limit the present application. Various changes and modifications can be made to the present application by those skilled in the art. Any modifications, equivalents, improvements, etc. made within

I claim:

1. A make-up assistance method, comprising:
   acquiring a facial image of a user;
   acquiring a makeup effect image selected by the user;
   extracting a make-up region from the facial image of the user, and transmitting the makeup effect image and information about the make-up region to a makeup matching server;
   performing, by the makeup matching server, a skin detection on the make-up region, so as to obtain skin information of the facial image;
   determining, by the makeup matching server, at least one makeup plan matched with the make-up region according to the skin information and the makeup effect image;
   presenting the at least one makeup plan matched with the make-up region from the makeup matching server;
   determining a difference between the makeup effect image and the facial image using a preset algorithm; and
   generating makeup modification prompt information for a region in the makeup effect image or the facial image where the difference is greater than a threshold, wherein the makeup effect image is an image obtained by applying a plurality of makeup effects to the facial image of the user,
   wherein the skin information comprises skin color information,
   wherein the determining, by the makeup matching server, at least one makeup plan matched with the make-up region according to the skin information and the makeup effect image comprises:
   selecting, from a plurality of base cosmetics each having a color, a base cosmetic having a color complementary to the skin color information obtained from the facial image, according to a difference between the skin color information obtained from the facial image and a skin color information of the makeup effect image,
   wherein the skin color information comprises a grayscale of a pixel and a color of a pixel, and the base cosmetic comprises a foundation and a blush.

2. The make-up assistance method according to claim 1, wherein the skin information further comprises a skin spot.

3. The make-up assistance method according to claim 2, wherein the determining, by the makeup matching server, at least one makeup plan matched with the make-up region according to the skin information and the makeup effect image comprises:
   selecting a concealer cosmetic from a plurality of concealer cosmetics according to a pixel feature of the skin spot and a pixel feature of a skin around the skin spot.

4. The make-up assistance method according to claim 2, wherein after extracting the make-up region from the facial image of the user, the make-up assistance method further comprises:
   improving a definition in the make-up region of the facial image using a face super-resolution algorithm.

5. The make-up assistance method according to claim 2, wherein extracting a make-up region from the facial image of the user comprises: identifying the make-up region in the facial image using a feature identification algorithm.

6. The make-up assistance method according to claim 2, wherein determining a difference between the makeup effect image and the facial image using a preset algorithm comprises:
   calculating at least one of a feature difference value, a texture difference value, or a color difference value between the make-up region in the facial image and a respective make-up region of the makeup effect image.

7. The make-up assistance method according to claim 2, wherein the make-up region comprises at least one of an eye region, a nose region, a mouth region, a cheek region, an eyebrow region.

8. The make-up assistance method according to claim 1, further comprising:
   generating a modified makeup effect image according to a modification operation performed by the user on the makeup effect image; and
   uploading the modified makeup effect image to the makeup matching server.

9. The make-up assistance method according to claim 1, wherein generating makeup modification prompt information comprises:
   highlighting a region in the makeup effect image or the facial image where the difference is greater than the threshold.

10. The make-up assistance method according to claim 1, wherein the make-up plan further comprises a make-up step for the makeup effect image.

11. A make-up assistance apparatus comprising a memory and a processor, the memory having stored therein instructions executable by the processor, wherein the instructions, when executed by the processor, cause the processor to execute the make-up assistance method according to claim 1.

12. A smart mirror comprising the make-up assistance apparatus according to claim 11.

13. A non-transitory storage medium having stored therein a computer program which, when executed by a computer, causes the computer to perform the make-up assistance method according to claim 1.

14. The make-up assistance method according to claim 1, wherein generating makeup modification prompt information comprises: prompting, by voice, a position of the region where the difference is greater than the threshold.

* * * * *